Aug. 11, 1925.   1,549,457
M. S. CUMNER ET AL
TOOL CONTROL MECHANISM FOR RELIEVING MACHINES
Filed May 28, 1921   6 Sheets-Sheet 1
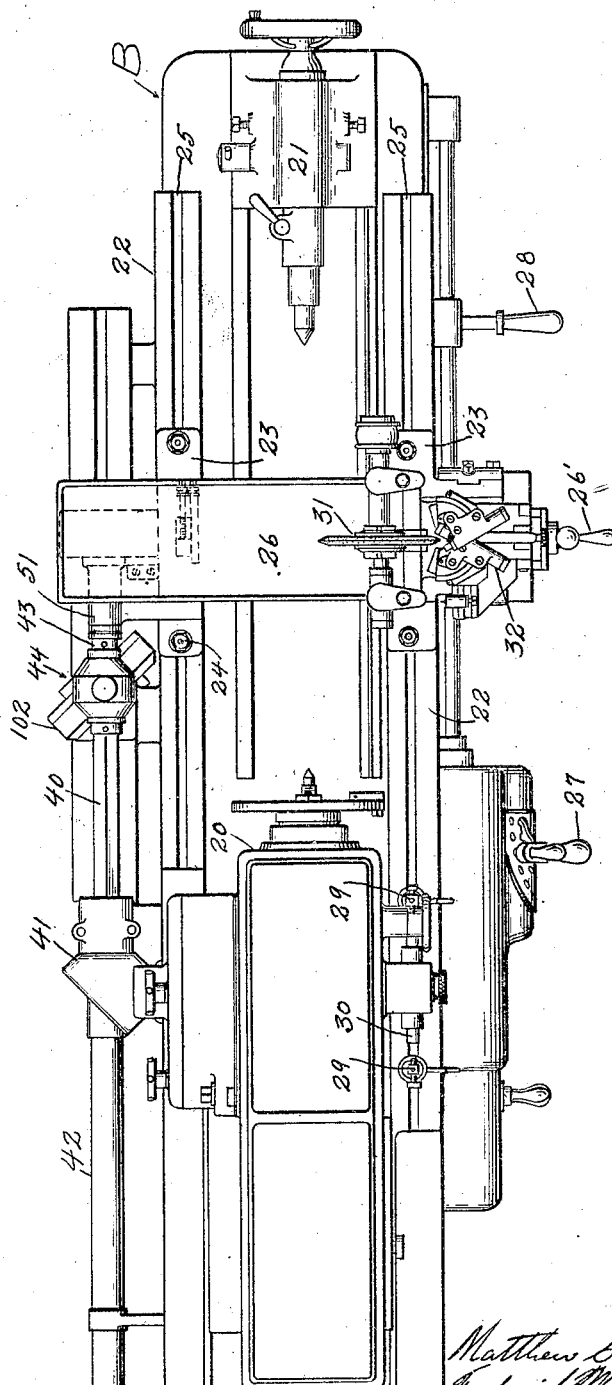

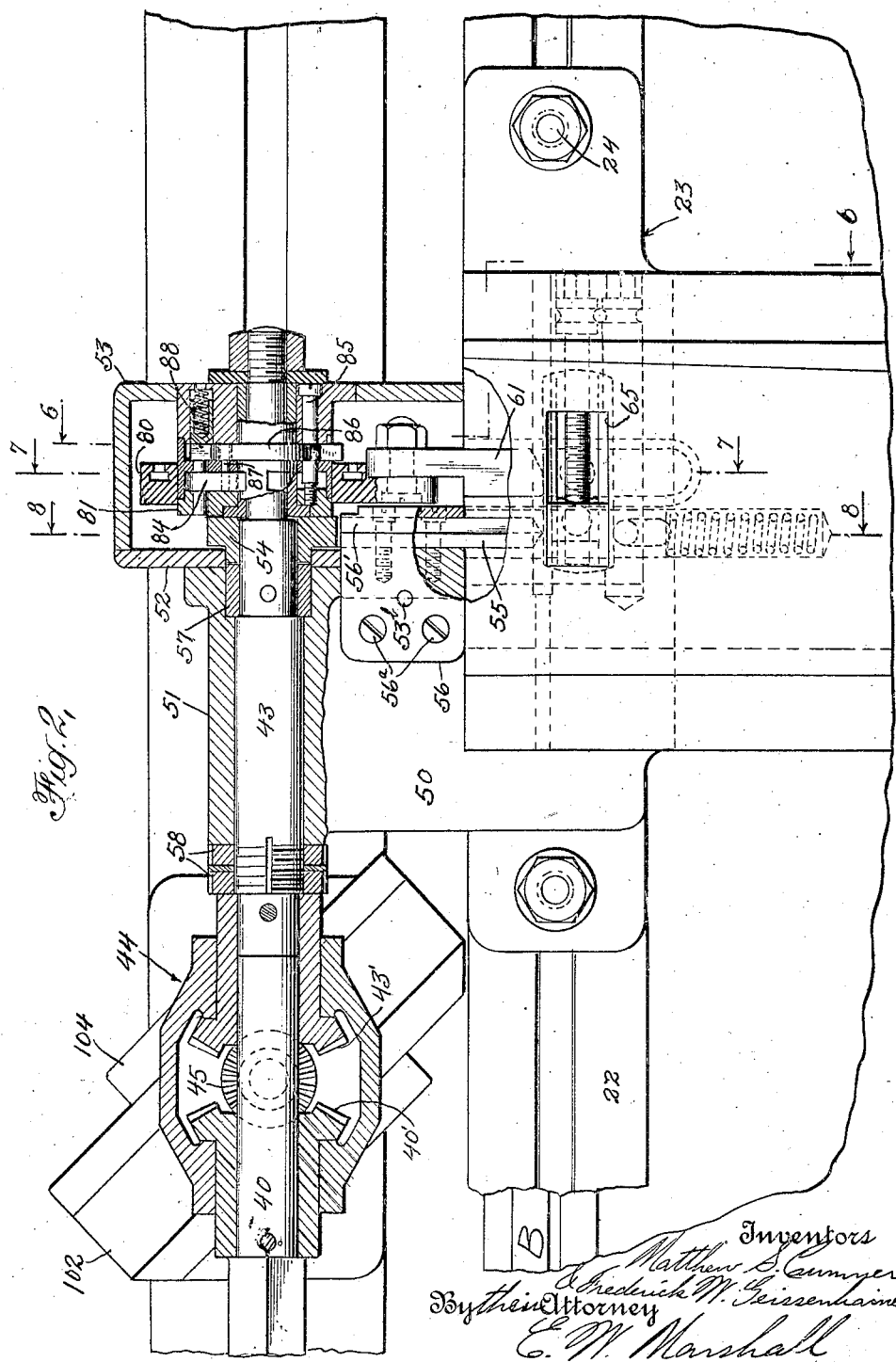

Aug. 11, 1925. 1,549,457
M. S. CUMNER ET AL
TOOL CONTROL MECHANISM FOR RELIEVING MACHINES
Filed May 28, 1921 6 Sheets-Sheet 3
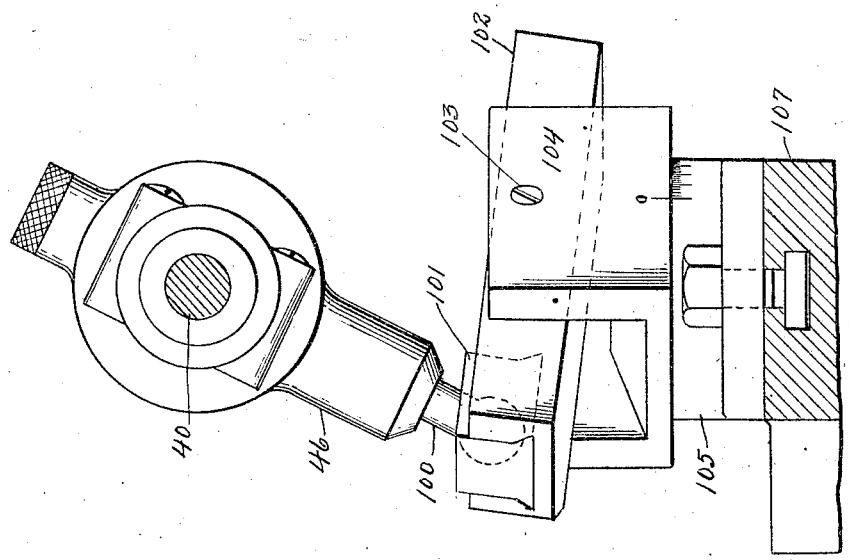
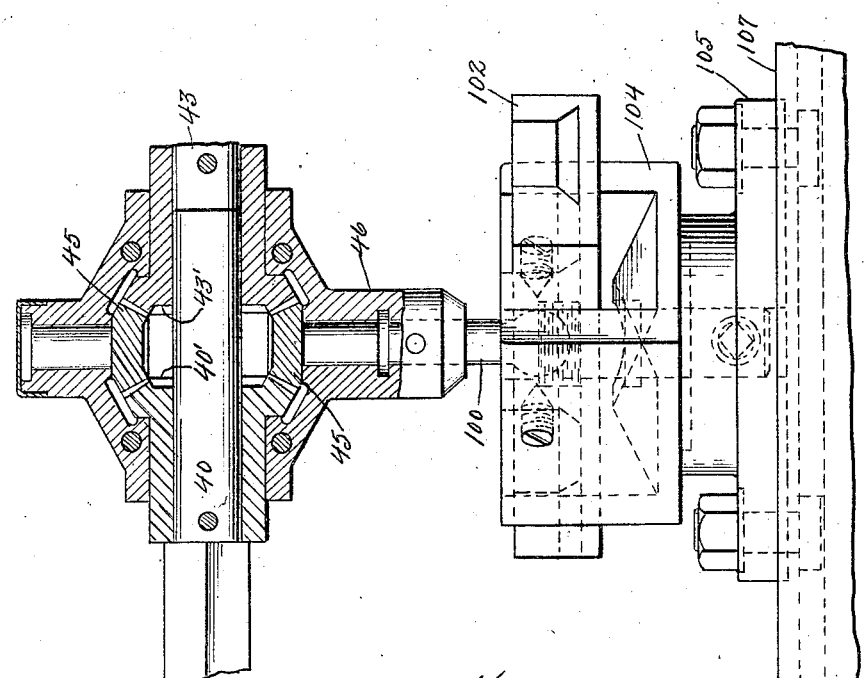

Aug. 11, 1925.　　　　　　　　　　　　　　　　1,549,457
M. S. CUMNER ET AL
TOOL CONTROL MECHANISM FOR RELIEVING MACHINES
Filed May 28, 1921　　　6 Sheets-Sheet 4
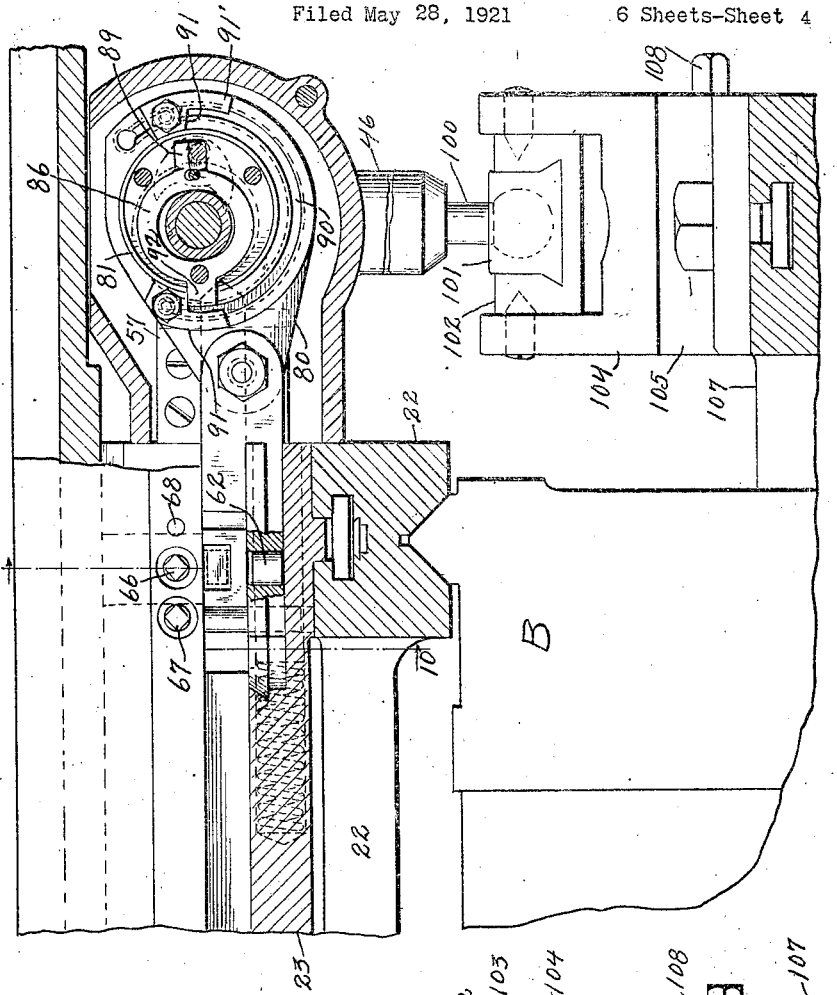

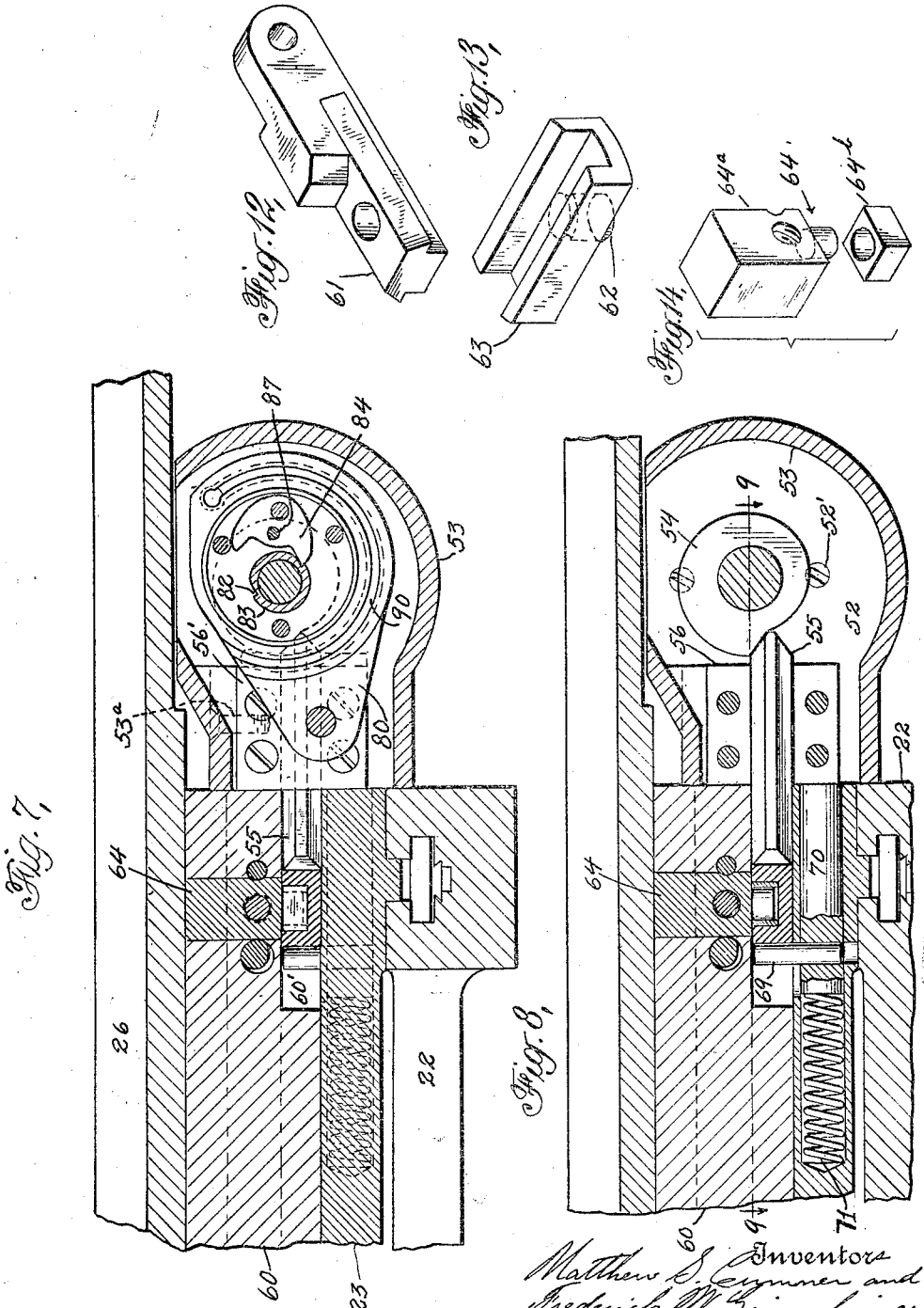

Aug. 11, 1925.
M. S. CUMNER ET AL
1,549,457
TOOL CONTROL MECHANISM FOR RELIEVING MACHINES
Filed May 28, 1921 6 Sheets-Sheet 6
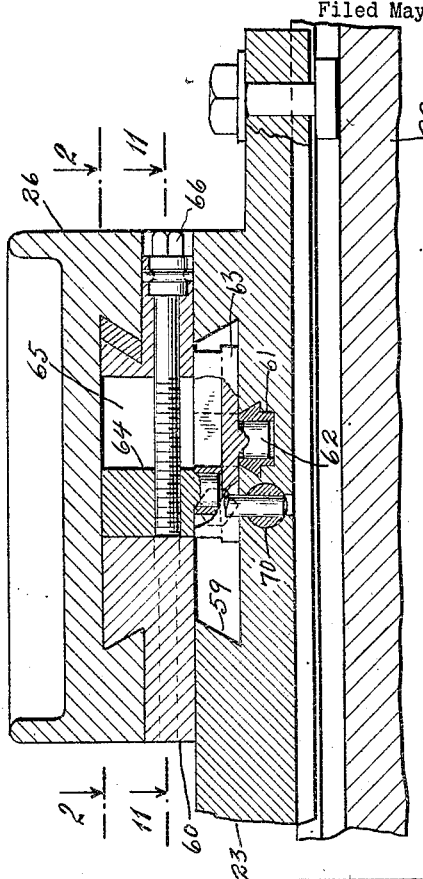
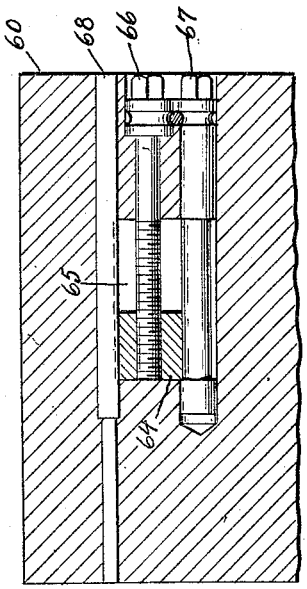
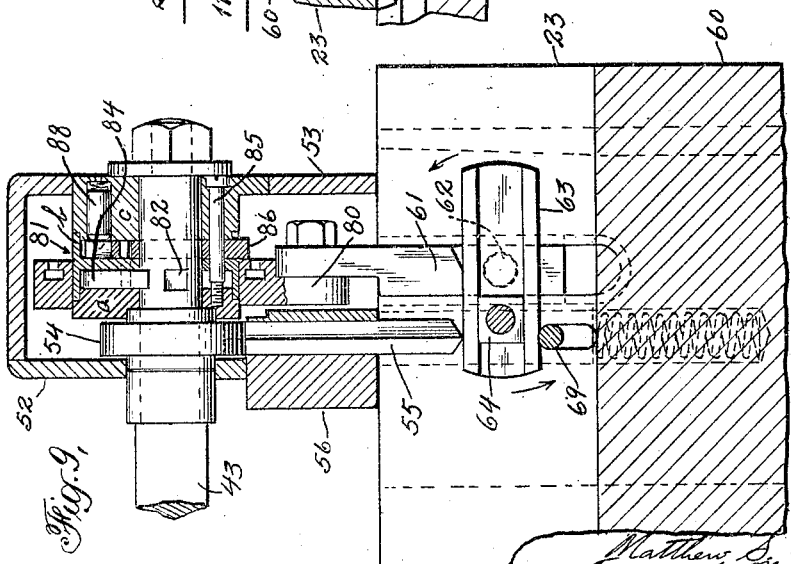
Inventors
Matthew S. Cumner &
Frederick W. Gessenhainer
By their Attorney
E. W. Marshall Patented Aug. 11, 1925.

1,549,457

UNITED STATES PATENT OFFICE.

MATTHEW S. CUMNER, OF NEW YORK, N. Y., AND FREDERICK W. GEISSENHAINER, OF FREEHOLD, NEW JERSEY, ASSIGNORS TO NESTOR MANUFACTURING COMPANY, INC., OF NEW YORK, N. Y., A CORPORATION OF NEW YORK.

TOOL-CONTROL MECHANISM FOR RELIEVING MACHINES.

Application filed May 28, 1921. Serial No. 473,525.

*To all whom it may concern:*

Be it known that we, MATTHEW S. CUMNER, a citizen of the United States of America, and a resident of New York, county and State of New York, and FREDERICK W. GEISSENHAINER, a citizen of the United States of America, and a resident of Freehold, Monmouth County, and State of New Jersey, have invented certain new and useful Improvements in Tool-Control Mechanism for Relieving Machines, of which the following is a specification.

This invention relates to machine tools and more particularly to means for automatically controlling the moving elements of such machine tools.

Heretofore it has been the practice to employ for the transverse motion control of such mechanisms a set of cams or other equivalent devices. These may take the form of a master unit of the kind that is to be produced on the machine.

The continual abrasion to which the wearing or sliding surfaces of these devices are subjected, results in a loss of accuracy, and the introduction of appreciable variations or tolerances in different units of a particular form of the product.

It is an object of the invention to provide means for controlling such machine movements with the utmost accuracy whereby the product may be turned out with a minimum of variation or tolerance independent of the quantity produced.

In accordance with this object, there are provided positive means for moving the tool carriage transversely at a rate proportional to its longitudinal speed.

According to another object, adjustable means for accurately predetermining the relative speeds of the mechanisms are provided, whereby the necessity of changing cams or masters when changing work, is eliminated. Thus by changing the adjustment or setting of said means the work may be taken out and replaced whenever desired without variations in the product from time to time due to unavoidable differences in the setting or location of the master.

Another feature relates to an indicator for indicating the setting, whereby a desired setting may be readily duplicated.

Another object relates to improved means for reciprocating tool carriages of machine tools, whereby a desired motion may be constantly repeated with great accuracy of control.

Other objects will appear as the description of the invention progresses.

Referring to the drawings:

Fig. 1 is a plan view of a machine embodying the invention, the machine shown being a grinding machine.

Fig. 2 is a detail plan, partly in section, taken on the plane of line 2—2 of Fig. 10, of the novel features of the invention.

Fig. 3 is a view in side elevation, partly in section, of the mechanism for advancing or retarding the time of reciprocation of the cutting tool to compensate for the spiral flute in the work being machined.

Fig. 4 is an end elevation of the mechanism shown in Fig. 3.

Fig. 5 is a vertical section through the mechanism shown in Figs. 3 and 4.

Fig. 6 is a vertical section taken on the plane of line 6—6 on Fig. 2.

Fig. 7 is a vertical section taken on the plane of line 7—7 on Fig. 2.

Fig. 8 is a vertical section taken on the plane of line 8—8 on Fig. 2.

Fig. 9 is a horizontal section taken on the plane of line 9—9 on Fig. 8.

Fig. 10 is a vertical section taken on the plane of line 10—10 on Fig. 6, parts being broken away.

Fig. 11 is a horizontal section taken on the plane of line 11—11 on Fig. 10.

Fig. 12 is a perspective view of a reciprocating bar.

Fig. 13 is a perspective view of an oscillating box which is adapted to be oscillated by the bar shown in Fig. 12.

Fig. 14 is a perspective disassembly view of a swivel block which is adapted to be actuated by the box shown in Fig. 13.

In the drawings like characters of reference indicate like parts throughout the several views.

The bed of the machine is indicated at B, the machine being a lathe having the usual head and tail stocks 20 and 21, respectively, in which are the usual centers for supporting the work to be turned. The main slide or carriage is indicated at 22 and is of the usual H form in plan. 23 indicates the toolcarriage bed which may be secured in various fixed positions on the slide 22 by means of the bolts 24 which are slidable in slots 25 in said slide. 26 indicates a table for supporting the cutting tool, in the present instance a grinding wheel. Interposed between the table and the bed 23 is a sub-base 60 having upper and lower dovetails for slidable engagement with the table and bed. The table is slidable on the sub-base by means of a feed screw 26' and the sub-base is reciprocable on the bed 23 by means hereinafter described.

The carriage or slide 22 is movable on the ways of the bed of the machine by a suitable lead screw (not shown) which is controlled by the usual mechanism 27 for varying its speed of rotation. 28 indicates the clutch-mechanism control and 29 the trip stops adjustably secured on the carriage 22 for operating the trip mechanism 30, which functions to reverse the lead-screw and other driving mechanism 40 at the back of the machine. Mounted on the table 26 is a cutting tool in the form of a grinding wheel 31, and 32 indicates trimming mechanism for the same.

At the back of the machine is a square shaft 40 which is slidable through a gear in a gear box 41 containing bevel gears driven from the head stock. A guard or tube 42 projects from one end of the gear case 41 for receiving the projecting end of the shaft 40. Alined with this shaft is a stub shaft 43, there being between said shafts mechanism in the nature of a differential indicated generally at 44 and hereinafter termed a spiral compensator. The adjacent ends of the shafts have affixed thereto bevel gears 40' and 43' which are in mesh with gears 45 carried by an arm or spider 46. When the spider is held against rotation, the gears 45 function merely as idlers whereby the shaft 43 is caused to rotate oppositely to the shaft 40 whereas when the spider is rotated a differential movement will be set up between the shafts as will be readily understood. The function of this mechanism will be more fully explained hereinafter. For the present it can be assumed that the shafts 40 and 43 rotate at the same rate of speed but in opposite directions because of the interposed idlers 45.

The mechanism for reciprocating the tool carriage or table will now be explained. Projecting from the carriage bed 23 is a shelf or bracket 50 (Fig. 2) having a bearing 51 for supporting the shaft 43. Secured to one end of the bearing is a plate 52 which cooperates with a housing member 53 to form a dust guard for mechanism operatively connected to the shaft 43. Screws 52' (Fig. 8) secure the plate to the bearing 51. The member 53 abuts against the bed 22 and the plate 52 to form a closed compartment and is secured in position by means hereinafter explained. Secured to the shaft 43 adjacent the plate 52 is a cam 54 which is adapted to wipe against a bar 55. Secured to the shelf 50 is a bar-supporting angle bracket 56. A plate 56' secured by screws to the bracket forms one half of the bearing for the bar which is preferably rectangular in cross section so as to be easily held against rotation. Screws 56ª secure the bracket 56 to the shelf 50. The housing 53 has a laterally extending shelf or lug which overlies the bracket 56 and through this lug passes a screw 53ª which enters a screw-threaded hole 53ᵇ in the bracket whereby the housing is removably held in fixed position. A collar 57 affixed to the shaft 43 at one end of the bearing 51 and adjustable nuts 58 at the other end of the bearing secure the shaft against axial displacement.

The carriage bed 23 has a dove-tail slot 59, (Fig. 10) in its upper surface for guiding a reciprocable slide 60 which slidably supports the tool table 26, relative movement between the slide and table being had by means of the usual feed screw 26'. The slide 60 is undercut as at 60' (Fig. 7) whereby a channel is formed between the bed 23 and slide 60 and into this channel the bar or plunger 55 projects.

Slidably mounted on the bed 23 is a pitman 61 which is adapted to be moved at predetermined times. Pivotally mounted on the pitman by means of a pivot post 62 is a guide box 63. Adjustably mounted in the box 63 is a block 64 composed of two parts 64ª and 64ᵇ which are swivelly connected. The part 64ª extends upwardly into a transversely extending slot 65 (Fig. 10) in the slide 60. Means for adjusting the block in said slot toward and from the pivot post 62 conveniently takes the form of a screw 66 fixed against axial movement and engaged with the block by means of screw threads therein. The block may be locked in adjusted position by means of an eccentric shaft 67. A key 68 may be provided to confine the block in its movable path. It will now be seen that if the box 63 is rocked about its pivot 62 the slide 60 will be given a reciprocatory movement assuming, of course, that the pivot of the block is not alined with the pivot 62 and that the pitman 61 is in fixed position. The plunger 55 is pointed to fulcrum on the box 63 on one side of the pivot thereof. Opposite the plunger and in contact with the box is a spring-pressed upstanding pin 69, the pin rising from a rod 70 which is slidably mounted in the bed 23. A spring 71 presses against the rod to maintain the pin 69 in engagement with the box 63. The action of the spring is to maintain the box 63 in engagement with the point of the plunger 55. It will now be seen that the box 63 is moved in one direction by the cam 54 through the plunger 55 and is moved in the opposite direction by the spring 71 through the rod 70 and pin 69, the net result being an oscillatory movement of the box about its pivot 62. Oscillation of the box imparts reciprocative movement to the slide 60 through the block 64 and hence also to the tool support proper, namely, the table 26. The degree or range of reciprocation is determined by the position of the block 64 with respect to the pivot 62 of the box 63 and the frequency of the same is determined by the speed of the shaft 43 as will now be readily understood. This reciprocatory movement enables the cutting tool, in the present instance the grinding wheel, to approach the work which is being continually rotated, to back off the hob or tap or other work as the case may be, and to back away from the work to clear the fluted edge of such work as hobs or the like. The cutting tool is positively moved away from the work by the cam 54 and plunger 55 but is resiliently held to the work by the spring 71. As the main carriage 22 is moved between the centers of the head and tail stocks, the shaft 40 enters or leaves the guard 42 in a well known manner.

The novel mechanism for throwing the cutting tool clear of the work when the end of a cut has been reached and for subsequently restoring the tool to its original position after the tool has been returned to starting position will now be described. As has already been pointed out, the box 63 is pivoted to the pitman 61. This pitman is connected to an eccentric strap 80 which surrounds an eccentric 81 mounted on the shaft 43. Interposed between the eccentric and shaft 43, is an over-running clutch mechanism which permits rotation of the shaft without carrying the eccentric with it. The arrangement is such that when the shaft is reversed the clutch mechanism is temporarily effective to lock the eccentric to the shaft whereby the throw of the eccentric will cause the pitman 61 to be moved transversely with respect to the shaft 43 as will be readily understood. This movement of the pitman will shift the pivot 62 of the box 63 sufficiently to make the cutting tool clear the work. The clutch mechanism includes oppositely disposed teeth 82 in a sleeve 83 which is affixed to the shaft 43. Pivoted to the eccentric 81 is a double armed pawl 84 which is adapted to engage one or the other of the teeth 82. Also pivoted on the eccentric 81 on a pivot 85 is a yoke 86 through which the sleeve and shaft pass (Fig. 6). Extending from one side of the pawl 84 is a pin 87 which enters into an arcuate slot in the yoke 86. The yoke serves to bring one arm or the other of the pawl into operative relation to one or the other of the teeth 82. The yoke is impositively locked in one position or the other by a pointed spring-pressed plunger 88 (Fig. 2), which tends to ride down on one side or the other of a ridged or V-shaped extension 89 on the yoke. By reference to Figs. 2 and 9, it will be seen that the eccentric is made up of three distinct members, "a," "b" and "c" which are held together as a unit by three screw bolts of which the yoke pivot 85 is one. The middle member "b" has an annular flange against which the members "a" and "c" engage and which are thus spaced from the web of the member "b" whereby pawl and yoke compartments are formed. The end of member "c" adjacent the terminal of the shaft 43 is concentric with respect to said shaft and has a bearing in the wall of housing 53.

The eccentric strap 80 has a T-shaped groove 90 in one of its side faces and secured in this groove are two adjustable abutments 91 against which an arm 92 on the yoke 86 is adapted to strike to disengage the pawl 84 from locking engagement with teeth 82. By adjusting the abutments the displacement of the pivot 62 of the box 63 can be varied within limits ranging from the full throw of the eccentric to a relatively slight displacement. The abutments have fingerlike extensions 91' which limit the approachment of the abutments proper to a distance which will permit the yoke sufficient movement to trip the pawl 84 following a reversal of the shaft 43. The mechanism operates as follows: In the position of the mechanism shown in Figs. 6 and 7 the shaft 43 is rotating in a clock-wise direction and hence the teeth 82 have no effect on the pawl 84. The cam 54 is operating on the plunger 55 to oscillate the box 63. The main carriage is traveling toward the head stock. When the limit of travel has been reached, the stop 29 on said carriage strikes the trip 30 whereupon the direction of rotation of the shaft 43 is reversed, i. e., the shaft 43 rotates counter-clockwise. The pawl 84 locks with a tooth 82 and the eccentric therefore turns with the shaft 43. The yoke 86 is carried along with the eccentric until the extension 92 strikes the opposite abutment 91 when the yoke will be rocked on its pivot to throw the pawl out of locking engagement with the tooth 82 by reason of the yoke striking the pin 87 projecting from the pawl. The spring-pressed plunger 88 is forced to ride up past the ridge of the V-end 89 of the yoke thus holding the yoke in its new position. The eccentric has moved the pivot 62 of the box 63 in a direction away from the shaft 43. The main carriage will be traveling back to starting position and when that position is reached the stop 29 will move the trip 30 to reverse the lead screw and direction of rotation of the shaft 43. The pawl will then lock with a tooth 82 (the upper tooth in Fig. 7); the eccentric will rotate clockwise until the extension 92 strikes the opposite abutment 91 when the yoke will rock to swing the pawl into the position shown in Figs. 6 and 7 ready to lock with the other (lower) tooth 82 when the shaft 43 is again reversed. The eccentric has moved to retract the pivot 62 of the box 63 and hence has moved the tool carriage into its original position. The position of the cutting tool on its table has not been disturbed during the aforesaid movements. If any advancement of the cutting tool into the work is desired, it must be effected by turning the feed screw 26'.

The spiral compensating mechanism will next be described. If the spider or idler-carrying arm 46 of the differential 44 is held against rotation, the bevel gears 45 carried thereby will function merely as idlers. By rotating the spider, a differential movement will be set up between its shafts 40 and 43. Projecting from and affixed to the spider 46 is a ball-headed post 100. The ball is secured in a socket 101 which is slidable in a guide-way 102. This guide-way is supported on trunnions 103 which are mounted in a turnable bracket or jaw 104. The jaw is connected to a base 105 by a vertical pivot 106, the base being adjustably mounted on a bench 107 which extends from the bed B of the machine. By turning of the jaw on its vertical pivot, the guideway 102 may be adjusted from a position parallel to the shafts 40 and 43 to various positions which are at angles thereto as indicated in Fig. 1. When the guideway is parallel to the shafts the post 100 moves along the guide-way without imparting rotation to the spider. When, however, the guide-way is at an angle to the shafts, said post travels transversely of the shafts and hence the spider 45 is given a slight rotation as the main carriage travels along the bed of the machine. This rotation gives an independent rotation to the shaft 43 whereby the time of action of the tool-table reciprocating cam 54 is changed with the result that the cutting tool is brought into contact with the hob or other work only at such times as will permit said tool to clear the edge of the spiral flute of the hob. As the spider rotates, the guide-way 102 turns on its trunnions 103 to conform to the arc of the circle in which the ball of the post 100 moves. The pivot 106 is a headed bolt, the head being seated in a countersink in the jaw 104. The pivot is vertically movable by means of an eccentric shaft 108 passing through the lower end thereof. The pivot and eccentric shaft thus serve to lock the jaw to its base.

The base and jaw are suitably graduated (Fig. 4) to enable the proper degree of angularity of the guide 102 with respect to the line of travel of the main carriage to be readily determined.

The invention is particularly adapted for use in thread-grinding machines but it will be obvious to one skilled in the art that the invention is capable of use in different relations. For the scope of the invention reference should be had to the appended claims.

What we claim is:

1. In a machine having a travelling and reciprocating tool carriage, means for changing the times of reciprocation of the carriage as it travels comprising a pair of shafts, a floating gear connecting said shafts and movable with the carriage, and means including an adjustable guide and a member carried by the floating gear and engaging the guide for imparting bodily movement to said gear as the carriage travels.

2. In a machine having a travelling and reciprocating tool carriage, means for changing the times of reciprocation of the carriage as it travels comprising a driving shaft and a driven shaft having gears on their adjacent ends, an idler gear in mesh with said gears, and means including a lever movable with the carriage for bodily shifting said idler about said shafts as the carriage travels.

3. In a machine having a travelling and reciprocating tool carriage, means for changing the times of reciprocation of the carriage as it travels comprising a guide adjustable out of parallelism with the line of travel of the carriage, a lever pivoted to swing on an axis parallel with said line of travel and having one end movable in the guide, a gear carried by said lever at a point remote from its pivot, and a pair of shafts operatively connected to said gear and serving to reciprocate the carriage, said lever being carried along with the carriage as it travels and controlled in its swinging movement by said guide.

4. The combination with the travelling carriage of a lathe and the tool table mounted thereon, of a driving shaft operatively connected to the table for reciprocating the same, means for changing the times of reciprocation of the table as the carriage travels, said means comprising an arm swingably supported coaxially with the driving shaft and bodily movable with the carriage, an arm-control member secured to the body of the lathe and adjustable to various fixed angular positions thereon, said member serving to swing said arm about its pivot as the carriage travels, and an idler carried by the arm, said driving shaft being divided and having its adjacent ends in gear with the idler whereby the shaft sections rotate in opposite directions.

5. The combination with the travelling carriage of a lathe and the tool table mounted thereon, of a driving shaft operatively connected to the table for reciprocating the same, means for changing the times of reciprocation of the table as the carriage travels, said means comprising an arm swingably supported coaxially with the driving shaft and bodily movable with the carriage, an arm-control member secured to the body of the lathe and adjustable to various fixed angular positions thereon, said member serving to swing said arm about its pivot as the carriage travels, and an idler carried by the arm, said driving shaft being divided and having its adjacent ends in gear with the idler whereby the shaft sections rotate in opposite directions, said arm-control characterized by a rockable member with which one end of the arm is slidably connected.

6. A machine tool comprising a bed, a travelling carriage thereon, a reciprocable tool table supported by said carriage, a shaft for reciprocating said table, a bench secured to said bed, and means for changing the times of reciprocation of the table as the carriage travels comprising an arm swingably supported coaxially with the shaft and bodily movable with the carriage, an arm-guiding member supported on the bench and adjustable to various angular positions with respect to the line of travel of the carriage, one end of said arm being slidably connected to said member and carrying an idler, said driving shaft being a divided shaft and having its adjacent ends in gear with said idler whereby the shaft sections rotate in opposite directions.

7. The combination in a machine tool having a travelling carriage and a tool table mounted thereon, of means for reversing the direction of travel of the carriage at predetermined times, means for automatically moving the tool table transversely of the line of travel of the carriage upon the reversal of direction of travel of the carriage, means for restoring the tool table to its original position upon a further reversal of direction of travel of the carriage and means for reciprocating a tool table as the carriage travels.

8. The combination in a machine tool having a travelling carriage and a tool table mounted thereon, of means for reversing the direction of travel of the carriage at predetermined times, means for automatically moving the tool table transversely of the line of travel of the carriage upon the reversal of direction of travel of the carriage, and means for reciprocating the tool table as the carriage travels.

9. The combination in a machine tool having a travelling carriage and a tool table mounted thereon, of means for reversing the direction of travel of the carriage at predetermined times, means for automatically moving the tool table transversely of the line of travel of the carriage upon the reversal of direction of travel of the carriage, and means for changing the times of reciprocation of the tool table.

10. The combination in a machine tool having a travelling carriage and a tool table mounted thereon, of means for reversing the direction of travel of the carriage between predetermined points, and means controlled by said carriage reversal means for shifting the tool table on said carriage.

11. The combination in a machine tool having a travelling carriage and a tool table mounted thereon, of means for reversing the direction of travel of the carriage between predetermined points, and means controlled by said carriage reversal means for shifting the tool table on said carriage, said table shifting means characterized by a rotating shaft and an over-running clutch.

12. The combination in a machine tool having a travelling carriage and a tool table mounted thereon, of means for reversing the direction of travel of the carriage between predetermined points, and means controlled by said carriage reversal means for shifting the tool table on said carriage, said table shifting means characterized by a rotating shaft and an eccentric combined with an over-running clutch.

13. The combination in a machine tool having a travelling carriage and a tool table mounted thereon, of means for reversing the direction of travel of the carriage between predetermined points, and means controlled by said carriage reversal means for shifting the tool table on said carriage, said table shifting means characterized by a rotating shaft, an eccentric combined with an over-running clutch, and means carried by the eccentric for disconnecting the clutch from the shaft.

14. The combination in a machine tool having a travelling carriage and a tool table mounted thereon, of means for reversing the direction of travel of the carriage between predetermined points and means for shifting the tool table on the carriage comprising a shaft, means for reversing the shaft as the direction of travel of the carriage is reversed, an eccentric on the shaft, means connecting the eccentric to the tool table, pawl mechanism for locking the eccentric to the shaft, and a trip mechanism for rendering the pawl mechanism ineffective at predetermined times.

15. The combination in a machine tool having a travelling carriage and a tool table mounted thereon, of means for reversing the direction of travel of the carriage between predetermined points and means for shifting the tool table on the carriage comprising a shaft, means for reversing the shaft as the direction of travel of the carriage is reversed, an eccentric on the shaft, means connecting the eccentric to the tool table, pawl mechanism for locking the eccentric to the shaft, and a trip mechanism for rendering the pawl mechanism ineffective at predetermined times, said pawl mechanism characterized by a double armed pawl carried by the eccentric.

16. The combination in a machine tool having a travelling carriage and a tool table mounted thereon, of means for reversing the direction of travel of the carriage between predetermined points and means for shifting the tool table on the carriage comprising a shaft, means for reversing the shaft as the direction of travel of the carriage is reversed, an eccentric on the shaft, means connecting the eccentric to the tool table, pawl mechanism for locking the eccentric to the shaft, and a trip mechanism for rendering the pawl mechanism ineffective at predetermined times, said trip mechanism characterized by a lever pivoted on the eccentric and a pair of abutments between which one arm of the lever is movable, said abutments serving to rock the lever as it is carried around by the eccentric, and a connection between the other end of the lever and pawl mechanism whereby the latter is rendered ineffective as the lever is rocked by contact with said abutments.

17. The combination in a machine tool having a travelling carriage and a tool table mounted thereon, of means for reversing the direction of travel of the carriage between predetermined points and means for shifting the tool table on the carriage comprising a shaft, means for reversing the shaft as the direction of travel of the carriage is reversed, an eccentric on the shaft, an eccentric strap surrounding the eccentric, means connecting the tool table to said strap, a pair of adjustable abutments carried by said strap, a lever pivoted on the eccentric and having one end thereof in the path of the abutments, a double armed pawl pivoted to the eccentric, and a connection between the pawl and lever, the lever being rocked by contact with either of said abutments whereby the pawl is disengaged from locking engagement with the shaft through said connection.

18. The combination in a machine tool having a traveling carriage and a tool table mounted thereon, of means for reversing the direction of travel of the carriage between predetermined points and means for shifting the tool table on the carriage comprising a shaft, means for reversing the shaft as the direction of travel of the carriage is reversed, an eccentric on the shaft, an eccentric strap surrounding the eccentric on the shaft, means connecting the tool table to said strap, a pair of adjustable abutments carried by said strap, a lever pivoted on the eccentric and having one end thereof in the path of the abutments, a double armed pawl pivoted to the eccentric, and an impositive lock for holding the pawl in contact with the shaft.

19. The combination in a machine tool having a traveling carriage and a tool table thereon, of automatically operable means for retracting said table to move the tool away from operative position and for returning the table and tool to operative position comprising a rotatable shaft, a cam on the shaft, a plunger in the path of the cam, an oscillatory member in the path of the plunger, and adjustable means connecting the tool table to said member.

20. A machine tool comprising a traveling and reciprocating carriage, means for varying the proportional speeds of the traveling and reciprocating motions, and a locking device for maintaining a desired proportion in fixed degree.

21. The combination in a machine tool having a travelling carriage and a tool table thereon, of automatically operable means for retracting said table to move the tool away from operative position and for returning the table and tool to operative position comprising a rotatable shaft, a cam on the shaft, a plunger in the path of the cam, an oscillatory member in the path of the plunger, a shiftable connection between the tool table and said member for regulating the reciprocatory motion imparted to the table, and spring means pressing said member against the plunger.

22. The combination in a machine tool having a travelling carriage and a tool table mounted thereon, of means for reciprocating said table to move the tool to and from operative position including a rockable member mounted on and carried by a slidable member, and means for moving said slidable member at predetermined times to shift the pivot of said rockable member.

23. The combination in a machine tool having a travelling carriage and a tool table mounted thereon, of means for reciprocating said table to move the tool to and from operative position comprising a rotatable shaft, a lever operatively connected to said table, means between said shaft and lever for rocking the latter, a slidable bar on which said lever is pivoted, and means mounted on the shaft for shifting said bar at predetermined times.

24. The combination in a machine tool having a travelling carriage and a tool table mounted thereon, of means for reciprocating said table comprising a rotatable shaft, a lever operatively connected to said table, means between said shaft and lever for rocking the latter, a slidable bar on which said lever is pivoted, an eccentric loose on the shaft, means for locking the eccentric to the shaft, means for effecting disengagement of said locking means, and means operatively connecting the eccentric to said slidable bar.

25. The combination in a machine tool having a travelling carriage and a tool table mounted thereon, of means for reciprocating said table comprising a rotatable shaft, a lever operatively connected to said table, means between said shaft and lever for rocking the latter, a slidable bar on which said lever is pivoted, an eccentric loose on the shaft, means for locking the eccentric to the shaft, means for effecting disengagement of said locking means, and means for changing the times of disengagement of said locking means.

26. In a machine tool having a travelling carriage, a tool table mounted thereon, a power operated shaft for reciprocating the table, means operated by said shaft for shifting said table at predetermined times, and means operated by the travel of the carriage and including elements movable with the carriage and adjustable by the travel of the carriage for varying the times of reciprocation of said table.

27. In a machine tool, the combination with a tool table, means for moving said table longitudinally at a uniform rate, and means for moving said table transversely; of means for varying the speed of transverse motion comprising a differential gear having a spider, and a control lever movable with the carriage adapted to impart a rotary motion to the spider of said differential gear.

28. In a machine having a movable carriage, means for moving the carriage in one direction, means for moving the carriage in a different direction at a relatively different speed comprising a divided shaft having gears on its adjacent ends, an idler gear in mesh with said gears, and means including a lever movable with the carriage for bodily shifting said idler about said shaft as the carriage moves in the first named direction.

29. In a machine tool, a tool table, means for moving said table longitudinally at a predetermined uniform speed, a shaft driven at a constant speed proportional to the rate of movement of said table, a second shaft axially coincident with said shaft and spaced apart therefrom, a pair of bevel gears integral with adjacent ends of said shafts, a plurality of idler gears adapted to mesh with said bevel gears, a spider constructed to support each of said idler gears in constant mesh with both of said bevel gears, said spider and gears being movable with the carriage, means for moving said table transversely actuated by said second shaft and means for rotating said spider actuated by longitudinal movement of said table.

30. In a machine tool, a tool table, means for moving said table longitudinally at a uniform rate, power driven means for moving said table transversely and adjustable means, including an adjustable guide and a lever guided thereby and movable with the carriage, independent of the rate of longitudinal movement for varying the rate of transverse movement.

31. In a machine tool, a tool table, a cutting tool positioned on said tool table, means for moving said table longitudinally at a uniform rate, means for reciprocating said table transversely to render said cutting tool active, and positive means, including a lever movable with the table during the longitudinal travel thereof for varying the extent of reciprocatory movement of said table whereby the depth of cut made by said tool may be adjustably varied.

32. In a machine tool, the combination with a stationary frame, a tool table, means for moving said table longitudinally at a uniform speed, and means for moving said table transversely at varying speeds; of means adapted to control the speed of transverse motion of said table comprising a pair of angularly adjustable parallel guides supported upon said frame and adapted to be pivotally oscillated on a common axis, a block slidably maintained between said guides, a control lever pivotally supported in said block and rotatably secured to the tool table whereby said block is slidably moved upon longitudinal movement of the table, and means actuated by lateral displacement of the pivoted portion of said lever for varying the speed of transverse movement of the table.

33. In a machine tool, a tool table, means for moving said tool table longitudinally at a predetermined uniform rate and automatic means for moving said tool table transversely comprising a constantly rotating shaft, a second shaft adapted to transversely move said table, a differential gear interconnecting said shafts, said gear having a spider, and automatic means operated by longitudinal movement of said table adapted to rotate the spider.

34. In a machine tool, a longitudinally movable rotating shaft, means for varying the speed of said shaft comprising a transversely rotatable lever bodily movable with said shaft, a pivot block pivotally secured to an end of said lever, and a relatively fixed guide engaging said block adapted to cause rotation of said lever upon longitudinal movement of said shaft.

35. In a machine, a plurality of gears, a rotatable housing enclosing said gears, a lever integral with said housing, means for moving said gears, housing and lever bodily, and a support for the free end of said lever comprising a pair of spaced parallel guides, a plurality of axially coincident trunnions for supporting said guides, a pivotal support for said trunnions whereby the axis of said trunnions may be adjusted, and a block slidably maintained between the free end of said lever and said block.

36. In a machine tool, a movable member, means for moving said movable member longitudinally at a uniform speed and means for moving said movable member transversely at varying speeds comprising a pair of angularly adjustable parallel guides spaced apart, a plurality of axially coincident trunnions for rotatably supporting said guides, a block slidably maintained between said guides, a control lever pivotally supported in said block and rotatably secured to said movable members, the plane of rotation of said lever being transversely disposed, and speed control means actuated by lateral displacement of the pivoted portion of said lever for varying the speed of transverse movement.

37. In a machine tool, a stationary frame, a tool table movably supported upon said frame, means for moving said tool table longitudinally at a predetermined uniform speed, means for moving said table transversely comprising a shaft, means for driving said shaft at varying speeds, a control lever rotatably secured to said shaft and adapted to rotate in a transverse plane, a pivotal support for the free end of said lever, a pair of parallel guides spaced apart, a plurality of axially coincident trunnions for supporting said guides, a pivotal support for said trunnions adjustably mounted on said frame, whereby the axis of said trunnions may be adjusted in the plane of movement of said table, a block slidably maintained between said guides integral with said lever support, and means for varying the speed of said shaft actuated by lateral displacement of the pivotal end of said lever.

38. In a machine tool, a movable carriage, a channel shaped member adapted to impart movement to said carriage, a block slidably positioned in the channel of said member, a second block pivoted in said slidable block, an adjusting screw for variably positioning said pivoted block, a cam adapted to impart movement to said member, means for rotating said cam whereby reciprocating motion is imparted to said member and said carriage, and means for varying the speed of rotation of said cam.

39. In a machine having a movable carriage, means for moving the carriage in one direction at a uniform rate, means for moving the carriage in a different direction at a relatively different speed, means for predetermining said last named speed comprising a guide adjustable out of parallelism with the line of said first named direction, a lever pivoted to swing on an axis parallel to said line, and having one end movable in the guide, a gear carried by said lever at a point remote from its pivot, and a pair of shafts operatively connected to said gear and serving to actuate said second moving means, said lever being carried along with the carriage as it travels and controlled in its swinging movement by said guide.

In witness whereof we have hereunto set our hands this 26th day of May, 1921.

MATTHEW S. CUMNER.
FREDK. W. GEISSENHAINER.